United States Patent [19]

Mori et al.

[11] Patent Number: 4,607,879

[45] Date of Patent: Aug. 26, 1986

[54] VEHICLE DOOR STRUCTURE

[75] Inventors: Katsunori Mori; Takuji Shimoda, both of Toyota; Kiyokazu Seo, Aichi, all of Japan

[73] Assignee: Toyota Jidosha Kabushiki Kaisha, Japan

[21] Appl. No.: 751,222

[22] Filed: Jul. 2, 1985

[30] Foreign Application Priority Data

Jul. 5, 1984 [JP] Japan ............................ 59-101724[U]

[51] Int. Cl.$^4$ .............................. B60J 1/08; E06B 7/22
[52] U.S. Cl. ................................... 296/201; 296/146; 296/202; 49/490; 49/493
[58] Field of Search ................... 296/201, 202, 146; 49/490–493

[56] References Cited

U.S. PATENT DOCUMENTS

| | | |
|---|---|---|
| 3,775,907 | 12/1973 | Weaver et al. .................. 49/491 |
| 4,409,756 | 10/1983 | Audenino et al. ............... 49/490 |
| 4,411,941 | 10/1983 | Azzola ............................ 49/490 |
| 4,433,867 | 2/1984 | Perry et al. ..................... 296/146 |

FOREIGN PATENT DOCUMENTS

| | | |
|---|---|---|
| 52111123 | 2/1972 | Japan . |
| 5157423 | 11/1973 | Japan . |
| 53160115 | 5/1975 | Japan . |
| 59-60051 | 4/1984 | Japan . |

Primary Examiner—Robert R. Song
Attorney, Agent, or Firm—Parkhurst & Oliff

[57] ABSTRACT

This invention relates to a vehicle door structure which has an improved outer aesthetic appearance and which can reduce air resistance along the outer surface of a vehicle. The vehicle door structure includes a fastener and a door weather strip. The fastener is fixed on a body side member of the vehicle, and the door weather strip is mounted on the fastener. The door weather strip includes a core portion made of solid rubber and a crust portion made of sponge rubber. The core portion includes an outer recess and the crust portion includes an inner recess and a contact portion. The fastener includes an outer hook inserted into the outer recess of the core portion of the door weather strip and an inner hook inserted into the inner recess of the crust portion of the door weather strip.

18 Claims, 6 Drawing Figures

VEHICLE DOOR STRUCTURE

BACKGROUND OF THE INVENTION

The present invention relates to a vehicle door structure which has a substantially flush outer surface. More particularly, the present invention relates to improvements in a door weather strip of the vehicle door structure, which improves the aerodynamics of the vehicle.

A vehicle door structure is disclosed in Japanese Utility Model Application Laid-Open No. Showa 59-60051. This publication discloses a fastener of a vehicle door structure for fastening door weather strips. The fastener includes a plurality of hooks on which the door weather strips are mounted.

Japanese Utility Model Application Laid-Open No. Showa 51-57423, discloses a conventional door weather strip. This conventional door weather strip has an engagement portion and a contact portion. The engagement portion of the conventional weather strip is made of solid rubber, and the contact portion of the conventional weather strip is made of sponge rubber. However, this conventional weather strip is not positioned on the outside of a vehicle, and, therefore, does not improve the operating efficiency of the aesthetic appearance of the vehicle.

FIGS. 5 and 6 of this application show cross-sectional views of vehicle door structures which are previously developed by applicants and not known by others. These vehicle door structures include a fastener 30, a front door weather strip 10 and a rear door weather strip 20. When a front door glass 60 is displaced downwardly and is not in contact with the front door weather strip 10, an outer edge 151 of the front door weather strip 10 is in contact with a side surface 351 of the fastener 30 thereby creating a substantially flush outer surface, as shown in FIG. 5. However, since the weather strip 10 is made of flexible sponge rubber, when the front door glass 60 is displaced upwardly, and a rear edge 601 of the front door glass 60 is in contact with portion 15 of the front door weather strip 10, the outer edge 151 of the front door weather strip 10 is separated from the direction to apart from the side surface 351 of the fastener 30 as shown in FIG. 6. Thus, an outer recess 159 of a main bridge 157 is opened by a force which is caused by the front door glass 60. As a result, an opening 170 is defined between the outer edge 151 of the front door weather strip 10 and the side surface 351 of the fastener 30. This opening 170 deteracts from the aesthetic appearance of the vehicle. Furthermore, the opening 170 increases the resistance in air flow along a side surface of the vehicle. This reduces the operating efficiency of the vehicle and results in noise at a high speed.

Generally, conventional vehicle door structures, which have conventional door weather strips have a space defined between a door and a body side member of the vehicle. This space results in noise when the vehicle is driven at a high speed, and reduces operating efficiency.

SUMMARY OF THE INVENTION

The present invention was developed in view of the foregoing background and to overcome the foregoing drawbacks. It is accordingly an object of this invention to provide a vehicle door structure which improves the aerodynamics of the vehicle when the door glass is in contact with a door weather strip. A further object of the invention is to improve the aesthetic appearance of the vehicle door structure.

The vehicle door structure includes a fastener and a door weather strip. The fastener is fixed on a center pillar, and includes an inner hook and an outer hook. The door weather strip includes a core portion and a crust portion. The core portion of the door weather strip is made of solid rubber and the crust portion of the door weather strip is made of sponge rubber. An outer recess is defined within the core portion of the door weather strip and the outer hook of the fastener is inserted into the outer recess of the door weather strip. An inner recess is defined within the crust portion of the door weather strip and the inner hook of the fastener is inserted into the inner recess of the door weather strip. The outer part of the crust portion of the door weather strip, which is made of sponge rubber, is the contact portion.

The outer recess of the door weather strip, therefore, will not separate, even when the door glass is in contact with the contact portion of the door weather strip.

BRIEF DESCRIPTION OF THE DRAWINGS

The above objects, features and advantages of the present invention will become more apparent from the description of the invention which follows, taken in conjunction with the accompanying drawings, werein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
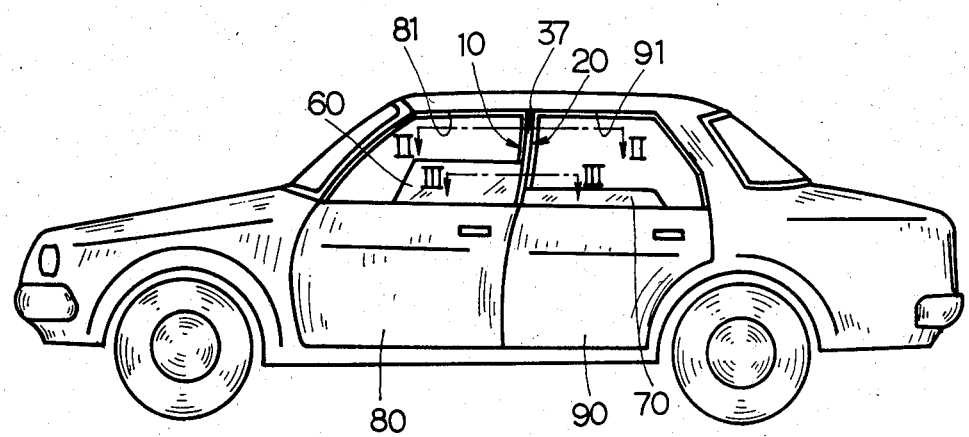
FIG. 1 is a perspective view showing a vehicle having a door which does not have any door frame.

Referring to FIG. 1, a vehicle includes a front door 80 and rear door 90. The front door 80 includes a front door glass 60 which is vertically displaceable, and the rear door 90 includes a rear door glass 70 which is vertically displaceable. The front and rear doors are pivotably mounted. A body side member, or the side of the car, includes openings 81 and 91 for a front and rear door, respectively. A front door weather strip 10, for sealing, is mounted on an inner peripheral edge of the front door opening 81, and a rear door weather strip 20, for sealing, is mounted on an inner peripheral edge of the rear door opening 91. An outer surface 37 of a fastener 30 for the weather strip 10 is positioned between the front door opening 81 and the rear door opening 91, and the outer surface 37 extends downwardly from a roof of the vehicle.

Figure 2:
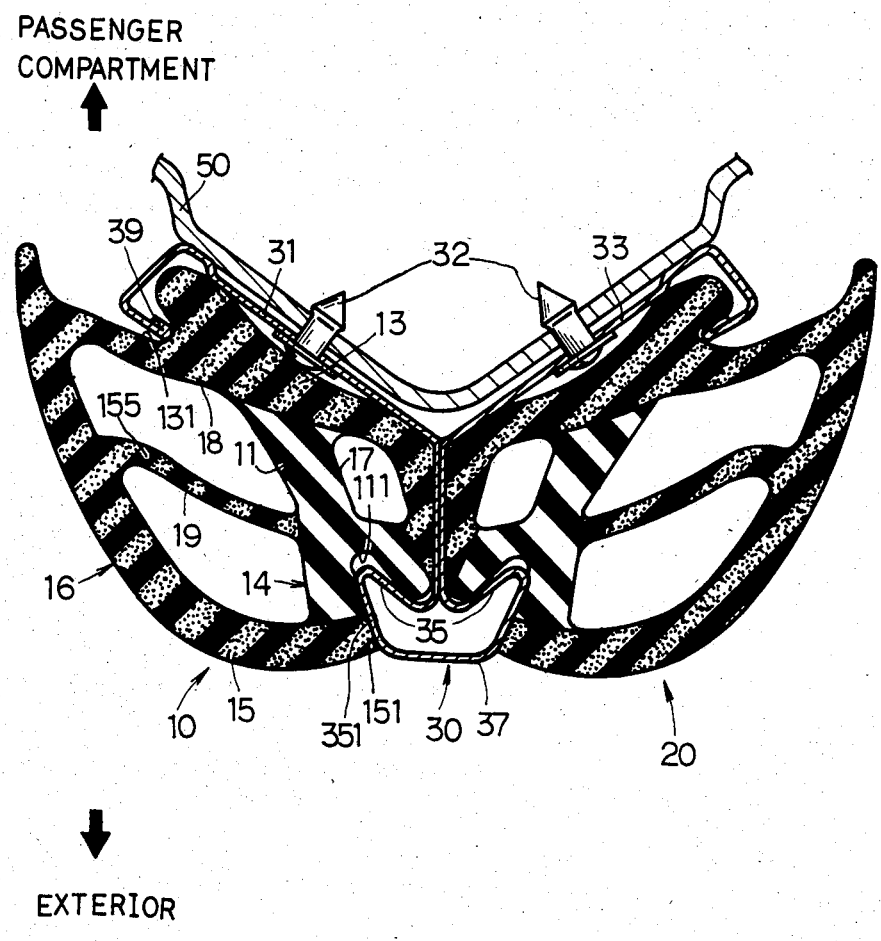
FIG. 2 is an enlarged cross-sectional view of a vehicle door structure according to the present invention, taken along the line II—II in FIG. 1, wherein front and rear door glasses are not in contact with the front and rear door weather strips.

FIG. 2 shows a cross-sectional view of a vehicle door structure located on an outside of a center pillar 50 of the vehicle. The fastener 30 is fixed on an outer surface of the center pillar 50 by a plurality of screws 32, and the fastener 30 includes a front portion 31, a rear portion 33 and the outer surface 37 thereof. A base 13 of the front door weather strip 10 is mounted on the front portion 31 of the fastener 30, and the rear door weather strip 20 is mounted on the rear portion 33 of the fastener 30. The front door weather strip 10 includes a core portion 14, which is typically made of a solid rubber of stylene-propylene rubber, and a crust portion 16 which is typically made of a sponge rubber of ethylene-propylene rubber.

A main bridge 11 and an outer recess 111 are formed within the core portion 14 of the front door weather strip 10, and an auxiliary bridge 155, an inner recess 131 and a contact portion 15 are formed by the crust portion of the front door weather strip 10. The base 13 of the front weather strip 10 is connected to the contact portion 15 by the main bridge 11, and the contact portion 15 is sustained on the main bridge 11 by the auxiliary bridge 155. A plurality of apertures 17, 18, 19 are defined between the base 13, the main bridge 11, the auxiliary bridge 155 and the contact portion 15 of the front door weather strip 10. An inner hook 39 and an outer hook 35 are formed on the front portion 31 of the fastener 30. The inner hook 39 of the fastener 30 is inserted into the inner recess 131 of the front door weather strip 10, and the outer hook 35 of the fastener 30 is inserted into the outer recess 111 of the front door weather strip 10. An outer edge 151 of the contact portion 15 of the front door weather strip 10 is in contact with a side surface 351 of the fastener 30.

An outer surface of the vehicle door structure, which includes an outer part of the contact portion 15 of the front door weather strip 10, the outer surface 37 of the fastener 30 and an outer part of the contact portion of the rear door weather strip 20, is substantially flush and smooth, because the side surface 351 of the fastener 30 and the outer edge 151 of the front door weather strip 10 will not separate.

Figure 3:
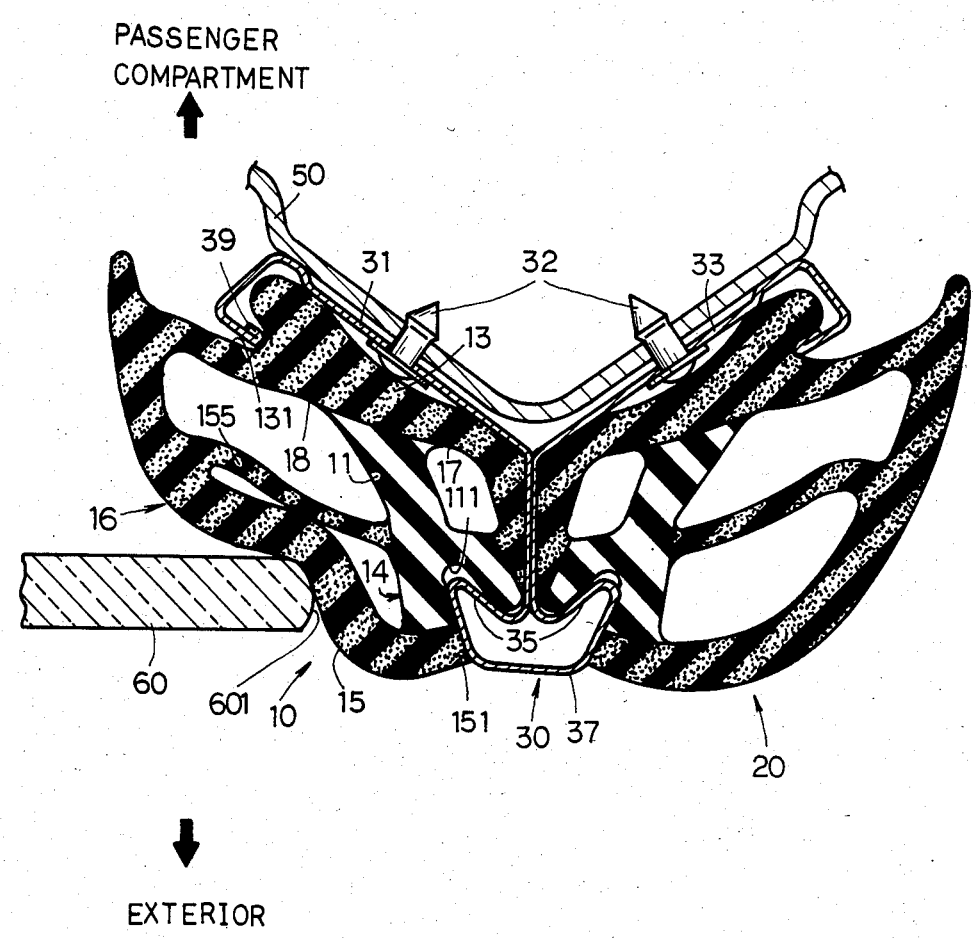
FIG. 3 is an enlarged cross-sectional view of the vehicle door structure, taken along the line III—III in FIG. 1, wherein a front door glass is in contact with a front door weather strip.

The front door glass 60 is in contact with the front door weather strip 10 in FIG. 3. A rear edge 601 of the front door glass 60 pushes the contact portion 15 of the front door weather strip 10 inwardly and rearwardly. The contact portion 15 is made of flexible sponge rubber, making it easily deformable, and the front door weather strip 10 includes a plurality of apertures. The contact portion 15 thus remains in close contact with the rear edge 601 of the front door glass 60. The outer recess 111 is made of resilient solid rubber and is located adjacent to the outer surface of the vehicle, in a substantially complementary engagement with the outer hook 35.

The outer recess 111 of the front door weather strip 10 will, therefore, not open and the outer edge 151 of the front door weather strip 10 and the side surface 351 of the fastener 30 will not separate even when the front door glass 60 is in contact with the contact portion 15 of the front door weather strip 10. Because the outer recess 111 is made of the solid rubber. Accordingly, the outer surface of the vehicle door structure, including the front and rear door glasses 60, 70, the front and rear door weather strips 10, 20 and the outer surface 37 of the fastener 30, is substantially flush and smooth, even when the front and rear door glasses 60, 70 are displaced upwardly up to their highest positions. This vehicle door structure, therefore, will reduce air resistance on the outer surface of the vehicle. As a result, this vehicle door structure will reduce a noise caused by the resistance on the air flow.

Figure 4:
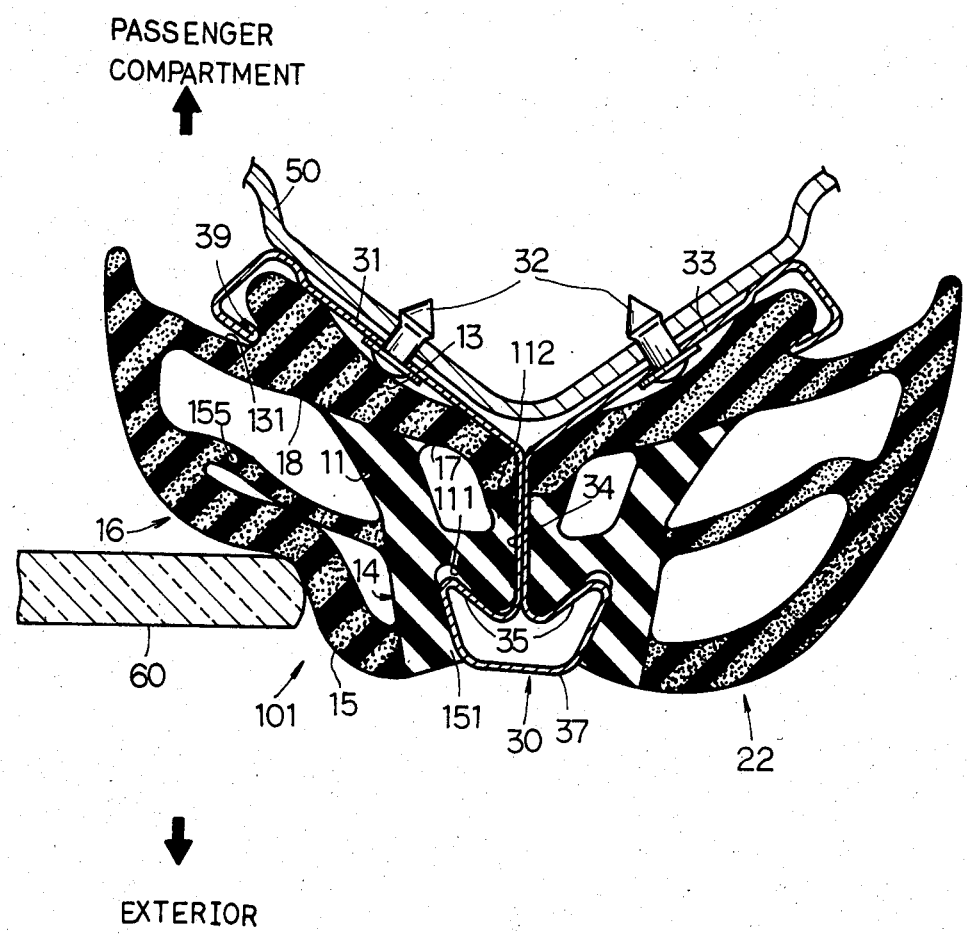
FIG. 4 is an enlarged cross-sectional view of a second embodiment of a vehicle door structure, taken along the line III—III in FIG. 1.
Figure 5:
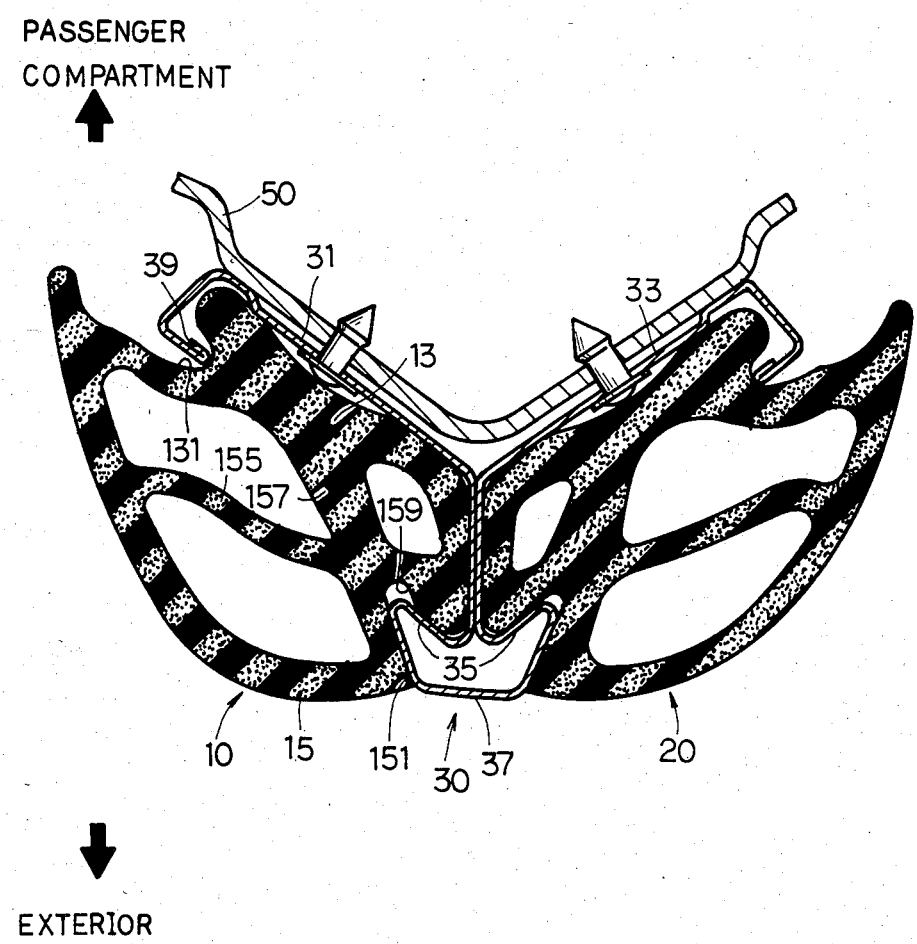
FIG. 5 is an enlarged cross-sectional view of a conventional vehicle door structure, taken along the line II—II in FIG. 1.
Figure 6:
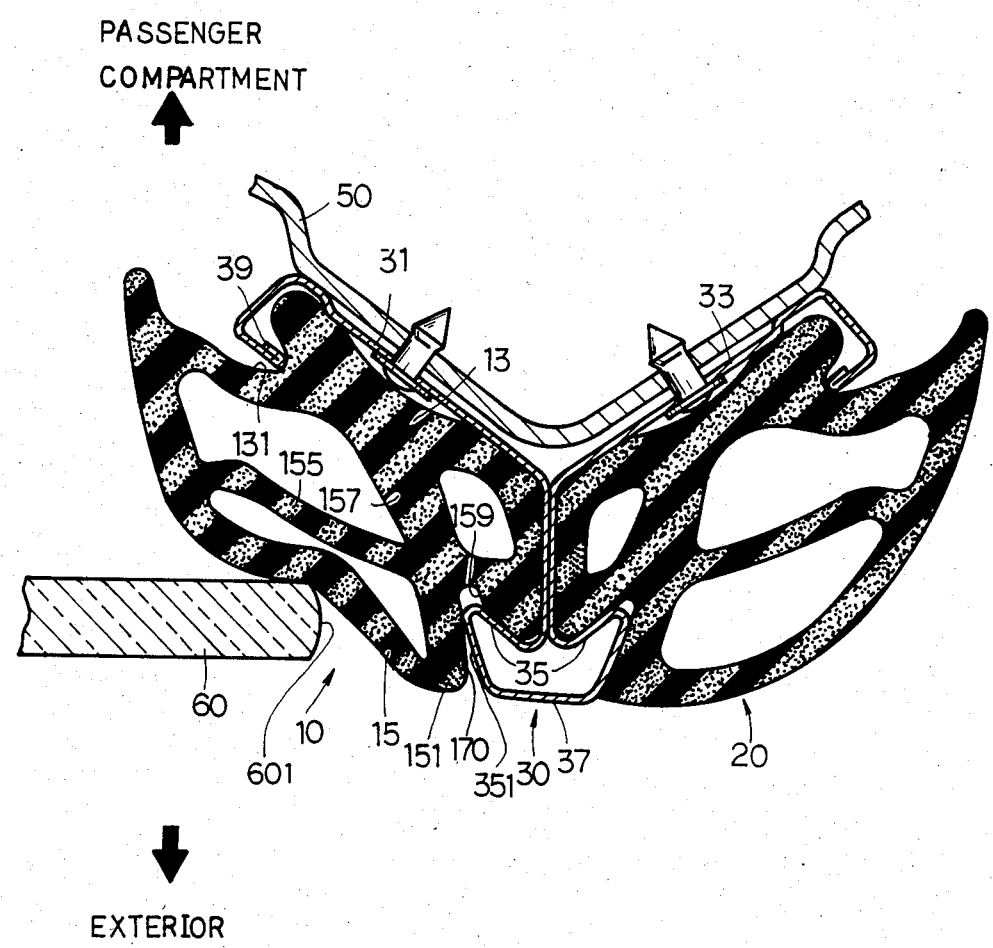
FIG. 6 is an enlarged cross-sectional view of the conventional vehicle door structure, taken along the line III—III in FIG. 1.

A second embodiment of a vehicle door structure is shown in FIG. 4. The second embodiment is similar to the first embodiment disclosed in FIG. 3. The major difference between the front and rear door weather strips 101, 22 shown in FIG. 4 and the front and rear door weather strips 10, 20 shown in FIG. 3, is that in FIG. 4 the core 14, made of solid resilient rubber, includes an outer edge 151 and a foot 112. The foot 112 sustains a main bridge 11 on an outer portion 34 of fastener 30. The core portion of the front door weather strip 101, therefore, cannot be moved rearwardly when the front door glass 60 is in contact with a contact portion 15 of the front door weather strip 101. Furthermore, the outer edge 151 of the front door weather strip 101 cannot be moved frontwardly when the front door glass 60 is in contact with the contact portion 15 of the front door weather strip 101.

The front and rear door weather strips 10, 20 can be made of chloroprene rubber. The base and an inner recess of the front or rear door weather strip can be made of a solid rubber.

As described herein, the present invention overcomes the shortcomings of the prior art by providing a door weather strip including a core portion which is made of a solid rubber and a crust portion which is made of a sponge rubber.

While the present invention has been described in its preferred embodiments, it is to be understood that the invention is not limited thereto, and may be otherwise embodied within the scope of the following claims.

What is claimed is:

1. A vehicle door structure comprising:
    a door glass, which is displaceable within a door mounted on a vehicle;
    means for sealing between the door glass and a body side member of the vehicle, said sealing means including a first portion and a second portion, the first portion of said sealing means comprising solid rubber, the second portion of said sealing means comprising sponge rubber, the first portion of said sealing means including a first recess, the second portion of said sealing means including a second recess and a contact portion, the contact portion positioned at an outside surface of the vehicle, said contact portion being defined between the body side member of the vehicle and the door glass, the contact portion adapted for contact with said door glass, the first recess of the first portion of said sealing means being located adjacent to the adjacency of the outside surface of the vehicle; and
    means for fastening said sealing means to the body side member of the vehicle, said fastening means having a first hook and a second hook, the first hook of said fastening means adapted to be inserted into the first recess of the first portion of said sealing means, the second hook of said fastening means adapted to be inserted into the second recess of the second portion of said sealing means.

2. The vehicle door structure of claim 1, wherein said first hook is an outer hook of the fastening means and wherein the second hook is an inner hook of the fastening means.

3. The vehicle door structure of claim 2, wherein said sealing means is a door weather strip.

4. The vehicle door structure of claim 3, wherein said fastening means comprises a fastener fixed on the side member of the vehicle.

5. The vehicle door structure of claim 4, wherein the second portion of said door weather strip further comprises a base attached to the fastener.

6. The vehicle door structure of claim 5, wherein the first portion of said door weather strip includes a main bridge extending between the base and the contact portion of the second portion of said door weather strip.

7. A vehicle door structure of claim 6, wherein the main bridge of said door weather strip further comprises a base attached to the fastener and connected to the base of the second portion of said door weather strip.

8. The vehicle door structure of claim 4, wherein the fastener further comprises a side surface extended from the first hook thereof, and the contact portion of the second portion of said door weather strip further comprises a surface being in contact with the side surface of said fastener.

9. The vehicle door structure of claim 8, wherein the fastener further comprises an outer surface which extends in the longitudinal direction of the vehicle, which forms a substantially flush outside surface on the vehicle with the contact portion of the door weather strip.

10. The vehicle door structure of claim 1, wherein the first portion is made of solid rubber comprising stylenepropylene.

11. The vehicle door structure of claim 1, wherein the second portion is made of sponge rubber comprising etylenepropylene.

12. A vehicle door structure comprising:
a center pillar extending vertically from a roof to a floor of a vehicle;
a fastener fixed on an outer surface of said center pillar, said fastener having a first hook and a second hook;
a door weather strip mounted on said fastener, said door weather strip including a core portion and a crust portion, the core portion comprising solid rubber and including a first recess, the first hook of said fastener being inserted into the first recess, the crust portion comprising sponge rubber, the crust portion having a second recess and a contact portion, the second hook of said fastener being inserted into the second recess, the contact portion being positioned at an outside surface of the vehicle, the first recess of the core portion of said door weather strip located adjacent to the outside surface of the vehicle; and
a door glass, which is vertically displaceable within a door, said door being pivotably secured to the vehicle, whereby when said door glass is displaced upwardly, said door glass is in contact with the contact portion of said door weather strip, and the contact portion of said door weather strip is positioned at the outside surface of the vehicle defined between said door glass and said fastener.

13. The vehicle door structur of claim 12, wherein the crust portion of said door weather strip further comprises a base being attached to said fastener.

14. The vehicle door structure of claim 13, wherein the core portion of said door weather strip includes a main bridge extending between the base attached to said fastener and the contact portion of the crust portion of said door weather strip.

15. The vehicle door structure of claim 14, wherein the main bridge of said door weather strip further comprises a base attached to said fastener and connected to the base of the crust portion of said door weather strip.

16. The vehicle door structure of claim 12, wherein said fastener further comprises a first side surface extended from the first hook thereof, and the contact portion of the crust portion of said door weather strip further comprises a side surface being in contact with the first side surface of said fastener.

17. The vehicle door structure of claim 16, wherein said fastener further comprises an outer surface which extends in the logitudinal direction of the vehicle, and which forms a substantially flush outside surface of the vehicle with the contact portion of the door weather strip.

18. A vehicle door structure comprising:
a door glass, which is vertically displaceable within a door mounted on a vehicle;
weather stripping means for sealing between the door glass and body side member of the vehicle, said weather stripping means including a first portion and a second portion, the first portion of said weather stripping means comprising a solid resilient rubber, the second portion of said weather stripping means comprising flexible sponge rubber, the first portion of said weather stripping means including a first recess, the second portion of said weather stripping means including a second recess and a contact portion being located at an outside surface of the vehicle, said contact portion being defined between the body side member of the vehicle and the door glass, the contact portion being in contact with said door glass, the first recess of the first portion of said weather stripping means being located adjacent to the outside surface of the vehicle; and
means for fastening said weather stripping means to the body side member of the vehicle, said fastening means comprising an outer hook and an inner hook, the outer hook of said fastening means being inserted into the first recess of the first portion of said weather stripping means, the inner hook of said fastening means being inserted into the second recess of the second portion of said weather stripping means, said fastening means fixed on the body side member of the vehicle;
said second portion of said weather stripping means including a base, said base attached to the fastening means adjacent said inner hook;
said weather stripping means also being attached to the fastening means at a side surface extending from said outer hook.

* * * * *